US010589325B2

(12) United States Patent
Helm

(10) Patent No.: US 10,589,325 B2
(45) Date of Patent: Mar. 17, 2020

(54) COOKING APPLIANCE WITH A PAN AND A METHOD FOR CLEANING THE PAN

(71) Applicant: Peter Helm, Wolfenbuettel (DE)

(72) Inventor: Peter Helm, Wolfenbuettel (DE)

(73) Assignee: MKN Maschinenfabrik Kurt Neubauer GmbH & Co. KG, Wolfenbuettel (DE)

( * ) Notice: Subject to any disclaimer, the term of this patent is extended or adjusted under 35 U.S.C. 154(b) by 1163 days.

(21) Appl. No.: 14/352,470

(22) PCT Filed: Oct. 18, 2012

(86) PCT No.: PCT/EP2012/070688
§ 371 (c)(1),
(2) Date: Apr. 17, 2014

(87) PCT Pub. No.: WO2013/057209
PCT Pub. Date: Apr. 25, 2013

(65) Prior Publication Data
US 2014/0299159 A1 Oct. 9, 2014

(30) Foreign Application Priority Data
Oct. 18, 2011 (DE) .................. 10 2011 116 091

(51) Int. Cl.
*B08B 9/093* (2006.01)
*F24C 14/00* (2006.01)
(Continued)

(52) U.S. Cl.
CPC .............. *B08B 9/093* (2013.01); *A47J 27/14* (2013.01); *B05B 3/025* (2013.01); *B05B 3/066* (2013.01);
(Continued)

(58) Field of Classification Search
CPC ..... B05B 3/025; B05B 3/066; B05B 13/0421; A47J 27/14; A47J 37/12; A47J 37/1242;
(Continued)

(56) References Cited

U.S. PATENT DOCUMENTS 1,631,045 A * 5/1927 Macon .................... A47L 15/22
134/175
2,641,270 A * 6/1953 Allen ...................... A47L 17/02
134/167 R
(Continued)

FOREIGN PATENT DOCUMENTS

DE 10134005 A1 1/2003
DE 102007005503 A1 7/2008
(Continued)

OTHER PUBLICATIONS

International Search Report, PCT/EP2012/070688, dated Jan. 14, 2013.

*Primary Examiner* — Eric S Stapleton
(74) *Attorney, Agent, or Firm* — Jansson Munger McKinley & Kirby Ltd.

(57) ABSTRACT

A method for cleaning the cooking space of a cooking appliance with a pan including adding a cleaning agent to the cooking space and if necessary, after this agent has been allowed to work for a certain period of time, a liquid jet is introduced under high pressure from the a spray head of a cleaning device through the at least one spray nozzle, which rotates around an axis perpendicular to the rotational axis of the spray head rotating around this axis. The liquid jet consists exclusively of water and which swirls and splashes the cleaning agent, and if necessary, after this splashed agent has been allowed to work for a further certain period of time, removes the residues mechanically from the bottom, the walls, and the inside surface of the lid, and (Continued)

wherein said residues are then carried away together with the washing solution out of the cooking space via the drain.

9 Claims, 4 Drawing Sheets

(51) Int. Cl.
    *A47J 27/14*           (2006.01)
    *B05B 3/06*            (2006.01)
    *B08B 9/00*            (2006.01)
    *B05B 3/02*            (2006.01)
    *B05B 13/04*          (2006.01)

(52) U.S. Cl.
    CPC ............ B05B 13/0421 (2013.01); B08B 9/00 (2013.01); F24C 14/005 (2013.01)

(58) Field of Classification Search
    CPC ......... F24C 14/005; B08B 9/00; B08B 9/093; B08B 9/0936
    USPC ..... 134/22.18, 115 R, 166 R, 177, 183, 201; 99/357
    See application file for complete search history.

(56) References Cited

U.S. PATENT DOCUMENTS

| | | | | |
|---|---|---|---|---|
| 3,001,534 A * | 9/1961 | Grant, Jr. | ................. | B05B 3/02 134/167 R |
| 3,329,529 A * | 7/1967 | Lamar | ................. | A47L 15/0097 126/273 R |
| 3,373,754 A * | 3/1968 | Squire | ................. | A47L 15/0097 126/273 R |
| 3,452,930 A * | 7/1969 | Karbo | ................. | B05B 3/0454 239/232 |
| 3,573,861 A * | 4/1971 | Lecrone | ................. | A47J 37/1214 99/404 |
| 3,583,638 A * | 6/1971 | Eby | ................. | B05B 15/70 239/206 |
| 3,593,718 A * | 7/1971 | Krasner | ................. | A61N 1/36521 607/20 |
| 3,657,011 A * | 4/1972 | Orr | ................. | A61L 2/04 134/17 |
| 3,670,746 A * | 6/1972 | Gehrmann | ................. | A47L 15/0097 134/107 |
| 3,685,433 A * | 8/1972 | Cunningham | ................. | A47J 37/1223 210/416.1 |
| 3,707,907 A * | 1/1973 | Wilson | ................. | A47J 37/1223 210/DIG. 8 |
| 3,741,808 A * | 6/1973 | Stalker | ................. | B05B 3/02 134/167 R |
| 3,770,204 A * | 11/1973 | Schuster | ................. | B05B 1/28 134/172 |
| 3,874,594 A * | 4/1975 | Hatley | ................. | B05B 3/0445 134/167 R |
| 3,921,912 A * | 11/1975 | Hayes | ................. | B05B 1/12 239/242 |
| 3,990,462 A * | 11/1976 | Elftmann | ................. | B08B 3/02 134/102.1 |
| 4,192,462 A * | 3/1980 | Erickson | ................. | B05B 1/28 134/183 |
| 4,420,006 A * | 12/1983 | Moore | ................. | A47J 37/1238 134/115 R |
| 4,502,373 A * | 3/1985 | Keating | ................. | A47J 37/1223 210/167.28 |
| 4,622,135 A * | 11/1986 | Williams | ................. | A47J 37/1223 137/335 |
| 4,623,186 A * | 11/1986 | Chavarria | ................. | F02B 77/04 134/175 |
| 4,684,412 A * | 8/1987 | Fritzsche | ................. | A47J 37/1233 126/392.1 |
| 4,700,617 A * | 10/1987 | Lee | ................. | A47J 27/14 134/115 R |
| 4,708,153 A * | 11/1987 | Hambleton | ................. | B01L 99/00 134/103.3 |
| 4,759,710 A * | 7/1988 | Polaczy | ................. | B23K 1/015 219/388 |
| 4,768,534 A * | 9/1988 | Anderson | ................. | A47L 15/0086 134/175 |
| 4,959,144 A * | 9/1990 | Bernard | ................. | A47J 37/1223 210/232 |
| 5,141,165 A * | 8/1992 | Sharpless | ................. | B05B 13/0431 239/752 |
| 5,263,504 A * | 11/1993 | Bailey | ................. | B05B 3/02 134/172 |
| 5,316,218 A * | 5/1994 | Bowen | ................. | B05B 13/0636 239/246 |
| 5,340,471 A * | 8/1994 | Wilson | ................. | A47J 37/1223 210/167.28 |
| 5,597,601 A * | 1/1997 | Griffin | ................. | A47J 37/1223 210/167.28 |
| 5,853,127 A * | 12/1998 | Heembrock | ................. | B08B 3/02 239/227 |
| 5,934,298 A * | 8/1999 | Singh | ................. | A47L 15/0086 134/115 R |
| 5,934,869 A * | 8/1999 | Janisse | ................. | B08B 3/02 134/183 |
| 6,182,561 B1 * | 2/2001 | Garner | ................. | A47J 37/129 99/403 |
| 6,405,738 B1 * | 6/2002 | Clark | ................. | A47J 37/12 134/115 R |
| 6,659,374 B1 * | 12/2003 | Chiera | ................. | B05B 13/0431 239/587.2 |
| 7,387,140 B2 * | 6/2008 | Brunn | ................. | F16J 12/00 141/18 |
| 7,556,034 B2 * | 7/2009 | De Miranda Grieco | ................. | F24C 14/005 126/211 |
| 7,677,239 B2 * | 3/2010 | De Miranda Grieco | ................. | F24C 14/005 126/211 |
| 7,827,906 B1 * | 11/2010 | Carter | ................. | A47J 37/129 99/367 |
| 7,885,521 B2 * | 2/2011 | Feinberg | ................. | A47J 37/1223 392/441 |
| 8,133,520 B2 * | 3/2012 | Feinberg | ................. | A47J 37/1223 426/302 |
| 8,151,697 B2 * | 4/2012 | Valentine | ................. | A47J 37/042 99/421 H |
| 8,375,848 B2 * | 2/2013 | Valentine | ................. | F24C 14/005 99/421 H |
| 8,535,113 B2 * | 9/2013 | Weidert | ................. | B05B 12/00 451/2 |
| 8,752,538 B2 * | 6/2014 | Valentine | ................. | F24C 14/005 126/1 R |
| 2003/0205246 A1 * | 11/2003 | Christman | ................. | A47L 15/0086 134/18 |
| 2003/0205248 A1 * | 11/2003 | Christman | ................. | A47L 15/0086 134/22.18 |
| 2003/0205250 A1 * | 11/2003 | DeBoer | ................. | A47L 15/0086 134/57 D |
| 2004/0195380 A1 * | 10/2004 | Wall | ................. | B05B 3/02 239/451 |
| 2006/0037632 A1 * | 2/2006 | Nito | ................. | A47L 15/4221 134/56 R |
| 2006/0054716 A1 * | 3/2006 | Lutzki | ................. | B05B 3/005 239/246 |
| 2007/0119977 A1 * | 5/2007 | Wang | ................. | B05B 3/0436 239/240 |
| 2008/0155756 A1 * | 7/2008 | Ogden | ................. | D06F 35/006 8/137 |
| 2008/0178412 A1 * | 7/2008 | Kiter | ................. | A61L 2/10 15/309.2 |
| 2009/0149364 A1 * | 6/2009 | Beck | ................. | C07C 211/63 510/165 |
| 2011/0030742 A1 * | 2/2011 | Dalsing | ................. | A47L 15/16 134/198 |

(56) References Cited

U.S. PATENT DOCUMENTS

FOREIGN PATENT DOCUMENTS

| | | |
|---|---|---|
| DE | 202008006364 U1 | 10/2008 |
| EP | 1953458 | 8/2008 |

\* cited by examiner

COOKING APPLIANCE WITH A PAN AND A METHOD FOR CLEANING THE PAN

The present invention pertains to a cooking appliance for the processing of food products with a pan and a cleaning device according to the introductory clause of claim 1.

The present invention also pertains to a method for cleaning the cooking space of a cooking appliance with pan.

Cooking appliances or cookers for the preparation of food products include designs comprising a pan, the interior of which forms the cooking space, and which in some cases can be covered by a lid. Cookers of this type are used especially in the area of large commercial kitchens and restaurants. The skillet-like, pan-like, or pot-like cooking spaces in these types of cookers are suitable in particular for the preparation of liquid, cream-like, or pourable food products such as, for example, soups, stews, vegetables, rice, and pasta. These cookers are also suitable for preparing menu items such as scrambled eggs or for grilling meat.

It is also possible in cookers of this type to prepare other types of menu items or even different menu items at the same time, one above the other in several layers by the use of adjustable devices.

The cookers suitable for high-volume food preparation must be cleaned after the associated cooking process. Up to now, this has always been done in practice by hand. Normally, the lid of the pan is flipped open so that the user has access to the cooking space. By means of a hand spray nozzle, the cooking space is treated with a liquid cleaning agent, which is allowed to work for a certain period of time, possibly with the help of additional heating. After the treatment time, the user will use brushes, for example, to carry out a mechanical cleaning. Finally, the user must ensure that no residues of the cleaning agent are left behind in the cooking space. For this purpose, the cleaning liquid must be removed and the cooking space rinsed. The overall process demands a great deal of work and requires large amounts of water and cleaning agent, because it is the user's responsibility to clean carefully all corners of the cooking space to ensure complete cleanliness and thus to meet the hygienic requirements of a commercial or restaurant kitchen.

Because the surface of the cooking space with the most food residue is usually the bottom, an appropriate washing solution consisting of cleaning agent and water is preferably introduced to clean it. This washing solution is then allowed to act for a certain period of time on the food residues present.

The quality and intensity of the cleaning action thus depend on the focused attention of the user and on his/her skill at cleaning all areas of the cooking space. In addition, the mechanical cleaning process brings with it the danger that considerable amounts of liquid could splash over the edge of the pan and into the kitchen, thus creating the need for even more mess to be cleaned up.

A cooker for the processing of food products is known from DE 101 34 005 A1, this device comprising a pan with a front wall, a rear wall, two side walls, and a bottom, which form an interior space serving as the cooking space. A lid serves to cover the cooking space, and the cooker also comprises a drain, which is formed in the bottom of the pan and which can be opened and closed as desired, so that liquid in particular can be drained out of the cooking space when necessary. The cooker according to DE 101 34 005 A1, which represents the general type of device in question here, comprises a cleaning device, which serves to clean the cooking space of the pan, wherein the cleaning device is connected to a feed device for introducing a liquid into the cooking space; the cleaning device also comprises a plurality of spray nozzles to spray the liquid into the cooking space. The spray nozzles are arranged next to each other on a rotatable bar, which can be rotated around an axis in the cooking space. The bar with the spray nozzles is arranged at a level essentially half way down in the cooking space, wherein the row of adjacent spray nozzles is aimed downward toward the bottom of the cooking space, and additional spray nozzles are able to spray horizontally at the level of the bar.

A significant disadvantage of the cleaning device for the cooker of this prior art is that the spray nozzles of the rotating sprinkler reach only a limited area of the cooking space, as a result of which the cooking space to be cleaned can be only partially sprayed with liquid cleaning agent. The lid in particular is subjected to no cleaning action at all, and simply spraying the various surfaces to remove the food residues does not lead to a satisfactory cleaning result.

The object underlying the present invention is to provide a cooking appliance with pan and a cleaning device, by means of which the user can achieve reliable and complete cleaning results, especially without the need for any additional mechanical procedures. A further object of the present invention is to provide a corresponding method for the complete, intensive, and satisfactory cleaning of the cooking appliance with pan.

The inventive cooking appliance is characterized in that the cleaning device is a high-pressure cleaning device, which is able to introduce liquid into the cooking space at high pressure, wherein at least one spray nozzle is arranged on a rotating spray head, and in that the cleaning device uses the liquid introduced under high pressure to swirl and splash around, in the cooking space, the cleaning agent which has been added to the cooking space.

As a result, the cleaning agent is distributed in the cooking space without any action on the part of the user, the cooking space thus being cleaned automatically in a manner previously unknown, as a result of which even stubborn residues can be removed.

The inventive method for cleaning the cooking space of a cooking appliance is characterized in that, after a cleaning agent has been added to the cooking space, and possibly after this agent has been allowed to work for a certain period of time, the residues are mechanically removed from the bottom, the walls, and the inside surface of the lid by means of a jet of liquid, which is introduced under high pressure from the spray head of the cleaning device to swirl and splash the cleaning agent, possibly after an additional period of time during which the cleaning agent is allowed to work.

This leads in advantageous fashion to the complete and essentially automatic cleaning of the cooking space and brings with it the additional advantage of a guaranteed cleaning result without any dependence on the attention of the user on the cleaning work.

The liquid introduced through the spray head of the cleaning device is preferably water, which is especially suitable for high-pressure cleaning, whereas cleaning agents, especially aggressive chemical cleaning agents, are not suitable for use under high pressures. Mild cleaning agents, however, are not suitable for removing the residues found in the cooking space, because their cleaning action is insufficient. Aggressive, alkaline, powdered, or incompletely dissolved powdered cleaning agents are also unsuitable for being pumped by a high-pressure pump. The reasons for this are the danger of corrosion and the possibility that the spray nozzle(s) could become clogged.

By avoiding the addition of the cleaning agent to the high-pressure liquid stream, therefore, the advantage is achieved that the chemicals used in the cleaning agent will not lead to any undesirable interactions with the components used to conduct the liquid medium, that is, in particular they cannot react with sealing or insulating materials or have any erosive effect on them. Components of the cleaning device are therefore not attacked, and it is possible to avoid the danger that inappropriate cleaning agents could clog the spray nozzle(s) in the spray head of the cleaning device.

By spraying the liquid, especially water, into the washing solution under high pressure, all of the surfaces of the cooking space can be wetted with the washing solution, as a result of which effective cleaning is achieved not only by the effect of the high-pressure spraying with water but also by the additional chemical cleaning effect acting on the surfaces. The term "high-pressure spraying" is to be understood according to the present invention as a process in which the liquid is sprayed at a pressure of up to 160 bars. The liquid jet emerging from the spray nozzle or nozzles has a velocity of up to 580 km/h.

According to the invention, cleaning can be carried out automatically in advantageous fashion without the need for any mechanical operations on the part of the user.

It is advantageous for the cleaning agent to be in the form of a concentrate in liquid form or in the form of a cartridge or a tab.

It is advantageous for the cleaning agent added to the cooking space to form a wash solution with the liquid present therein or with liquid subsequently introduced, which solution is then swirled or splashed about in the cooking space by the high-pressure cleaning device.

It is also advantageous for the cleaning device to comprise a rotating spray head, designed as an orbital head, with at least one nozzle orifice. The concept of an orbital head is to be understood as a jet spray head in which two different rotational movements are produced, one superimposed on the other. Spray nozzles are preferably distributed essentially uniformly around a rotational circumference, these nozzles being able to rotate around an axis perpendicular to a second axis, namely, the axis around which the top of the spray head which carries the spray nozzles rotates. A system of gears can be used to make the one type of rotational movement dependent on that of the other.

It is also advantageous for the cleaning device to comprise a removable cleaning arm, which carries the rotating spray head and which can be fastened in the cooking space to the wall of the pan. By means of the arm, it is possible in advantageous fashion to position the spray head in the cooking space in such a way that the entire inside surface of the cooking space, i.e., the bottom, side walls, and inside surface of the lid, will be treated by the jets of liquid coming from the spray nozzles.

For this purpose, the spray head is advantageously arranged in the upper half of the cooking space, especially underneath the lid at a distance from the top edge equal to more-or-less one-sixth to one-third of the height of the rear wall, and essentially in the center between the side walls.

The inventive method for cleaning the cooking space of a cooking appliance with pan advantageously comprises the following steps:
   (a) closing the drain leading from the cooking space of the pan;
   (b) adding the cleaning agent to the cooking space;
   (c) closing the lid;
   (d) introducing liquid from the spray head of the cleaning device into the cooking space;
   (e) dissolving the cleaning agent in, and mixing the cleaning agent with, the liquid to form a washing solution at the bottom of the cooking space of the pan;
   (f) distributing the washing solution thus formed in the cooking space by means of the liquid jet introduced under high pressure from the spray head of the cleaning device;
   (g) allowing the distributed washing solution to work on the food residues in the cooking space;
   (h) opening the drain; and
   (i) removing the loosened food residues by means of the liquid jet from the spray head.

If a liquid cleaning agent is being used, the mixing process is not absolutely necessary, because the agent dissolves immediately. If a cleaning powder or a cleaning tab is used, these are mechanically dissolved by the powerful high-pressure jet. The powerful jet forces a mixing action to occur.

It is advantageous to carry out the following step after step (i): rinsing until clear by treating the walls of the cooking space with fresh water for a previously determined period of time. This leads in advantageous fashion to the complete removal of the cleaning agent together with the loosened food residues and to an especially reliable end result of the required cooking space cleaning process.

It is also advantageous to carry out the above-described steps (f) and (g) of the inventive method several times in succession, depending on how dirty the cooking space is; this can be programmed in advance. The experienced operator knows, as a function of the amount of food residue present, which cleaning steps he must program to repeat in order to achieve the desired cleaning result.

As previously mentioned, the high-pressure jet coming from the spray nozzles swirls or splashes the washing solution, wherein it is especially advantageous for the jet coming from the spray head of the cleaning arrangement to be designed in such a way that it pushes and lifts the washing solution in wave-like fashion against the walls of the cooking space and the lid. It pushes the washing solution out in front of itself from the bottom area and throws it against the walls and the lid of the cooking space, which is made possible by the considerable pressure of the liquid jets.

According to a special advantage of the present invention, the jet coming from the spray head of the cleaning device is controlled in such a way that, at least for a certain period of time, it passes over only the bottom of the cooking space, this being done in particular by controlling the movement of the spray head so that it travels only back and forth, or alternatively by supplying the liquid to the spray head only during the time that the spray head is passing over the area of the bottom. This offers the advantage that the walls and the inside surface of the lid which have been sprayed with the cleaning solution are not washed off again immediately by the liquid, which means that the cleaning agent is free to exert its effects for a previously determined period of time before being washed off.

It is also advantageous for the heating unit of the cooking space to be turned on to heat the washing solution before, during, and/or after the wetting phase. As a rule, the grease, for example, present in the food residues dissolves more quickly at elevated temperature. It has also been found to be advantageous for the washing solution to be at least 5 mm deep at the beginning of the wetting phase. This provides a sufficient amount of liquid, so that the liquid jet or jets coming from the spray head can splash or swirl it around in the cooking space and thus wet all of the inside surfaces of the cooking space.

What is achieved overall is therefore that the cleaning agent, which represents the chemical component, works together in a highly efficient and synergistic manner with the spray jet, which represents the mechanical component. The water jets striking the bottom and the walls of the cooking space lead not only to a swirling or splashing of the washing solution present in the cooking space and to the wetting of the inside surfaces of the cooking space but also to a mechanical removal of the residues and of the washing solution from the inside surfaces of the cooking space and thus fulfill a double function.

The heating unit of the cooking space can also be used advantageously to dry the cooking space after the cleaning, as a result of which the remaining moisture can be evaporated.

Because, according to the inventive method, the cleaning agent is allowed to act first specifically on the especially dirty bottom of the cooking space and then on the side walls and the lid, wherein the cleaning agent or washing solution is possibly also heated, an intensive and complete hygienic cleaning effect is achieved, as a result of which the cooker can always be returned to a completely clean state which meets all of the hygienic requirements, it being especially advantageous that this can be accomplished automatically. This offers the advantage that, after the cooker has been used in the commercial kitchen, cafeteria, or restaurant, the cleaning process can be carried out even by a helper and will still lead to a reliable cleaning result.

Additional advantages of the present invention are described below.

One or more sensors can be arranged in the cooking space, preferably in the areas which are critical with respect to the cleaning process, as a result of which the cleaning process in these critical areas can also be evaluated from the outside.

The sensors can in particular be optical sensors, by means of which the operator can check the cleaning result and initiate additional cleaning steps if necessary.

A camera, for example, can be used for this. The camera can also be used during the cooking process to acquire information on how vigorously the contents are boiling, for example, and to provide this information to the user of the cooker. Such cameras or optical sensors can be designed to determine, during the cleaning process, whether and possibly what kinds of dirt or food residues are still present in the critical areas of the cooking space and to transmit this data to the cleaning control unit, which can then make use of the data to operate, for example, a device actuator. This can lead advantageously to optimization of the cleaning time and also of the energy balance with respect to water consumption and cleaning agent consumption.

Additional details, features, and advantages of the present invention can be derived from the following description of the drawings of an exemplary embodiment of the present invention:

In the figures, elements of the embodiments which correspond to each other are designated by the same reference numerals.

Figure 1:
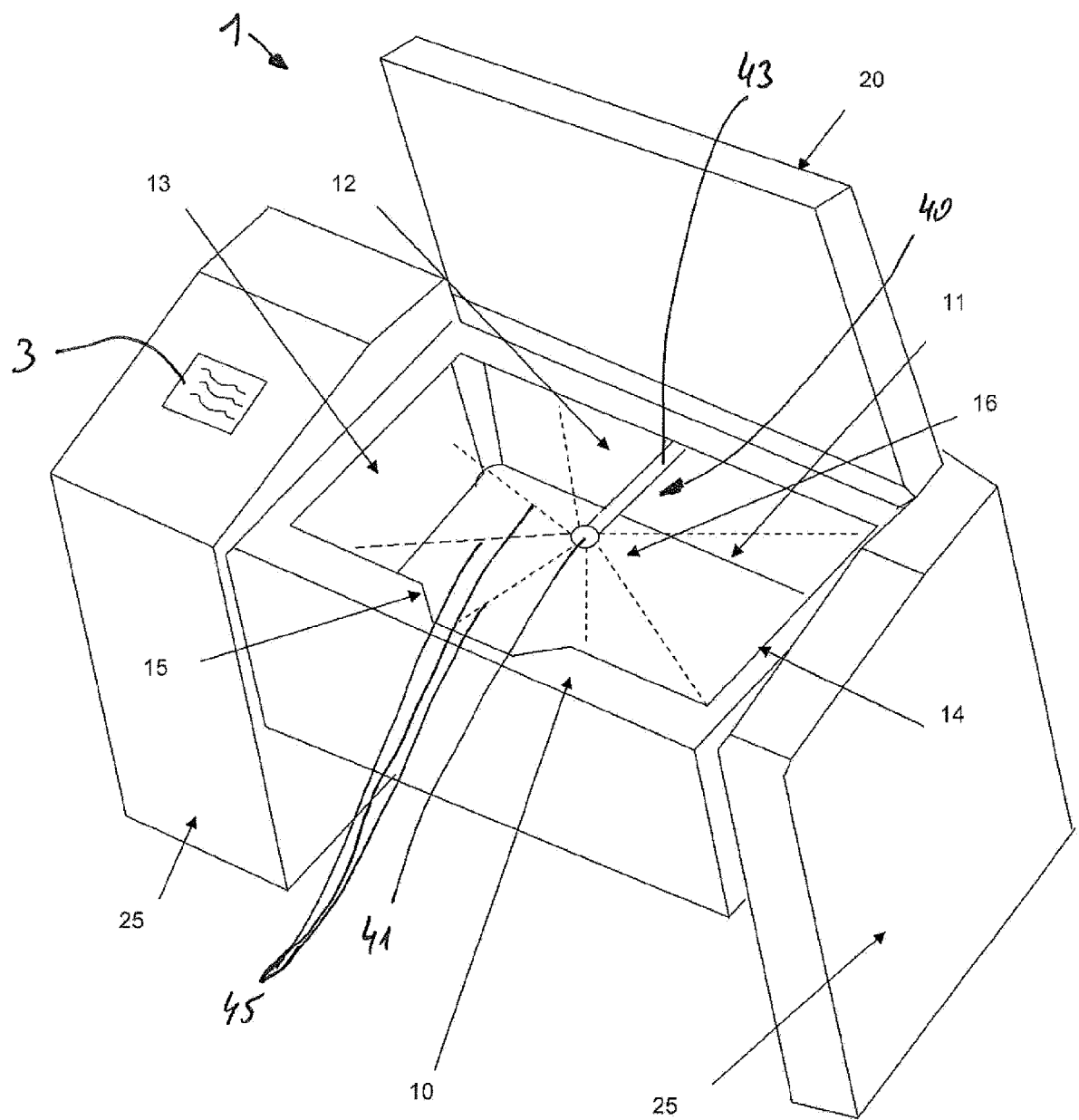
FIG. 1 shows a perspective view of one embodiment of an inventive cooking appliance.

FIG. 1 shows a perspective view of an inventive cooking appliance or cooker 1 from the above right. The inventive cooker 1 comprises a pan 10, which is designed in the form of a pot or tub. Although the pan 10 can have different shapes such as a semispherical shape like a wok or a cylindrical shape, the pan 10 shown in FIG. 1 is rectangular.

The pan 10 of the inventive cooker 1 comprises a more-or-less level or slightly slanted flat bottom 11, from which the walls extend upward. The walls comprise a front wall 15, a rear wall 12, and shorter side walls 13 and 14, which connect the front and rear walls to each other.

The walls with the individual wall parts 12, 13, 14, and 15 and the bottom 11 connecting the walls together at their lower edges enclose an interior space, which forms the cooking space 16 in the cooker 1.

Heating elements (not shown) can be arranged in the walls 12, 13, 14, and 15 and/or in the bottom 11, so that the cooking space 16 and its corresponding content can be heated.

Because of its tub-like, pan-like, or pot-like shape, the cooker 1 is especially suitable for preparing liquid recipes such as soups, thick or creamy recipes such as goulash or loose or pourable items such as rice, noodles, or peas. Dishes such as scrambled eggs can also be prepared in the cooking space 16.

At the top, the cooking space 16 can be covered by a lid 20. In most cases and especially also in the embodiment shown here, this lid 20 is hinged by a joint to the top edge of the rear wall 12, so that it can be flipped up or down to open or close the space.

When the lid 20 is closed, it is possible to cook in the cooking space 16 under elevated pressure, which is especially advantageous, because it is then possible to cook the food present in the cooker more quickly.

If the bottom 11 is heated appropriately, it is also possible to roast or to fry food in the pan 10 shown in FIG. 1. FIG. 1 shows the cover 20 in the open position.

The pan 10 is supported by frame elements 25 in such a way that it can be tilted, wherein the cooker can be controlled from a control panel 3, which can be used to enter commands into a corresponding control unit, which in turn operates the various devices present in the cooker such as the heaters, the drive for moving the lid 20, the devices for tilting the pan, etc. by way of appropriate actuators.

As can also be seen in FIG. 1, a cleaning device 40 is shown in merely schematic fashion. This device comprises a cleaning arm 43, which is mounted removably on the rear wall 12 of the cooking space 16. At the forward end of the cleaning arm 43, the cleaning device 40 comprises a spray head 41, which is designed preferably as an orbital head, as will be explained in greater detail below with reference to FIG. 3. The spray head 41, when in operation, is able to emit high-pressure liquid jets 45, which serve to clean the cooking space 16.

Figure 2:
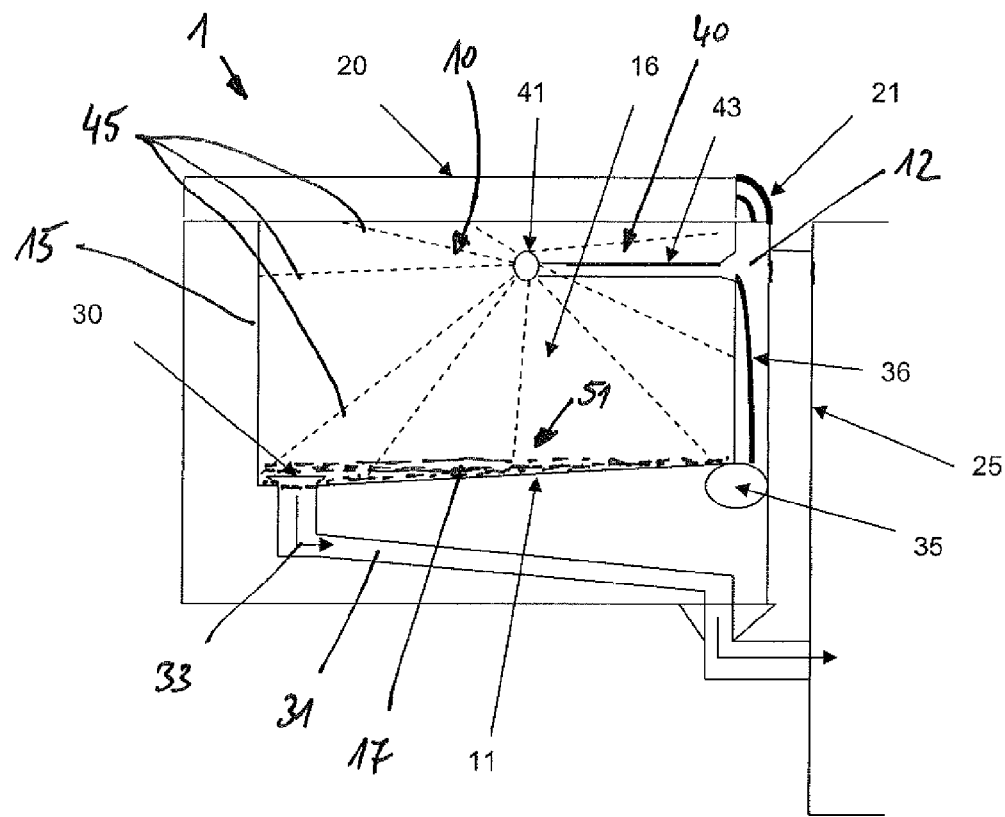
FIG. 2 shows a cross section through the embodiment of the inventive cooking appliance shown in FIG. 1.

FIG. 2 shows a schematic cross-sectional diagram of the cooker 1 (without cross-sectional shading). The inventive cooker 1 is shown with the lid 20 in the closed position, and the cleaning device 40 is shown in operation.

As can be seen in FIG. 2, the bottom 11 of the cooking space 16 is tilted slightly to the left, so that the liquid collecting on the bottom 11 can flow toward the drain 30, wherein, by way of a corresponding drain pipe 31, liquid can be discharged from the cooker 1, as indicated by the arrow 33. The schematically illustrated drain 30 comprises openings at the level of the bottom 11; through these openings, the liquid can flow into the drain pipe 31.

A hinge or joint 21 allows the lid 20 on the pan 10, in which the cooking space 16 is formed, to open and close; this hinge is merely suggested in FIG. 2.

As can also be seen in FIG. 2, the drain pipe 31 leads from the drain 30 toward the bottom right of the frame 25, from which point the drained-out liquid can be taken away.

As can also be seen in FIG. 2, a cleaning device 40 is provided, which can be attached removably at the rear wall 12 to an appropriate feed line (not shown), this device being used to clean the cooking space 16 after the food has been prepared. Liquid, especially water, is supplied to the cleaning device 40 through the arm 43 and thus to the spray head 41; this liquid is sprayed under high pressure into the cooking space, where it serves to clean the walls, the bottom 11, and the inside surface of the lid 20, i.e., to loosen adhering residues such as condensate, grease, and food residues; to wash them off; and then to carry them away via the drain 30.

Figure 3:
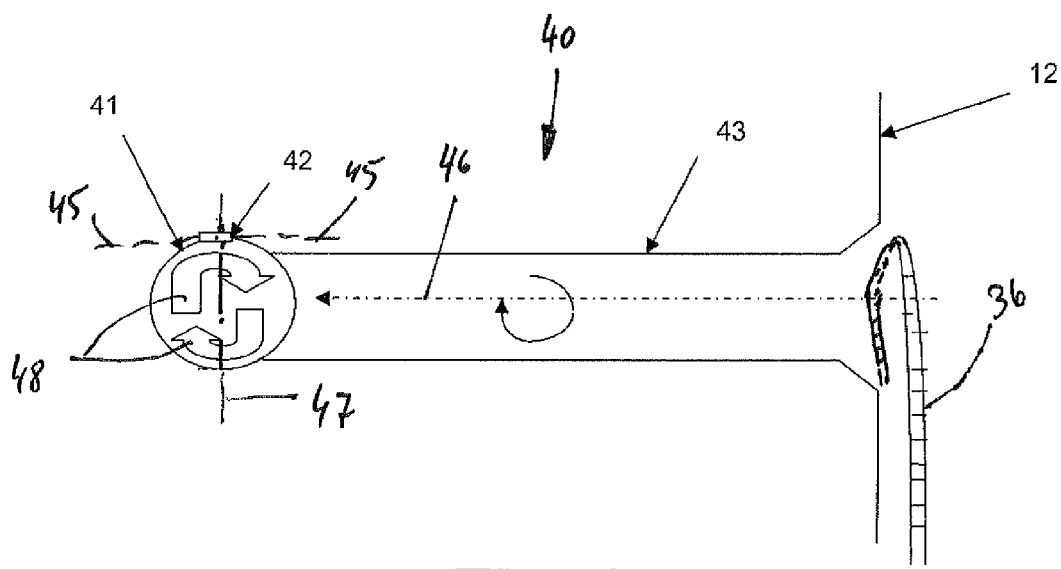
FIG. 3 shows an enlarged view of the cleaning device of the inventive cooking appliance.

As can be seen in FIG. 3, the cleaning device 40 comprises the spray head 41 on the cleaning arm 43, wherein the spray head 41 is able to rotate around the axis 46 of the arm 43. As FIG. 3 shows, the spray head 41 is designed as an orbital head, which rotates around the rotational axis 46, but it also comprises spray nozzles 42, which rotate around the axis 47, as shown by the arrows 48, to produce the liquid jets 45.

Figure 4:
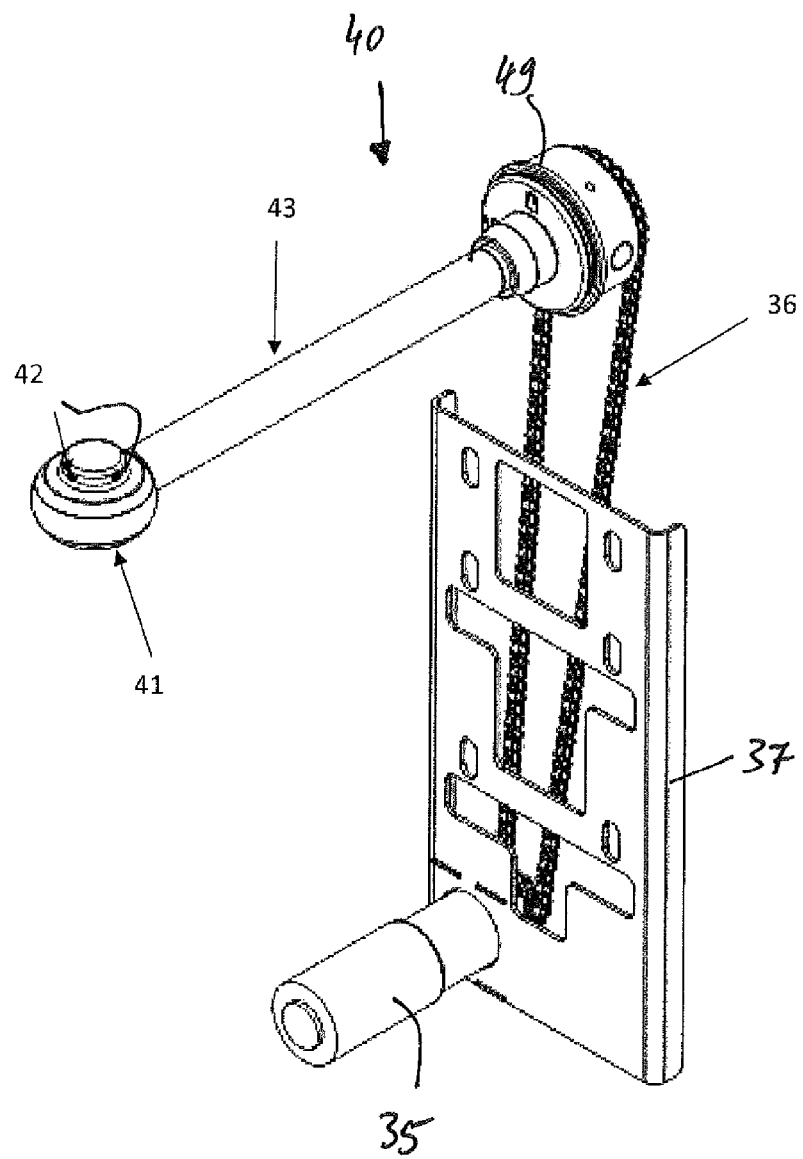
FIG. 4 shows a perspective view of the cleaning device of the present invention and its drive.

In the embodiment according to FIG. 3, the rotation of the spray head 41 is driven by an internal pipe (not shown), which is set into rotation by a chain 36, as is illustrated even more clearly in FIG. 4.

As can be derived from FIG. 4, a motor 35 drives the drive chain 36, which for its own part causes the internal pipe (not shown) of the arm 43 to rotate, as a result of which the spray head 41 turns around the rotational axis of the arm 43.

By means of a bevel gear, the spray nozzles 42, four of which are shown here by way of example and which are offset from each other by 90°, are set in rotation, so that the spray nozzles 42 perform a composite rotational movement, which comprises one degree of freedom as a result of the positive guidance by the bevel gear. FIG. 4 shows an example of one way in which the motor 35 and the drive chain 36 can be secured in position by a mounting plate 37.

The arm 43 of the cleaning device 40 is connected to a coupling 49, to which the feed line (not shown) is also connected, through which the liquid is conducted into the cleaning device, i.e., through the rear wall 12, into the arm 43, and from there to the rotatable spray head 41.

The feed line can also be connected to a reservoir for the liquid, if desired.

The arm 43 is mounted on the rear wall 12 at the midpoint between the side walls 13 and 14 and also a certain distance below the top of the cooking space, this distance being equal to essentially one-sixth to one-third of the height of the rear wall 12 underneath the lid 20.

As can be seen in FIG. 4, which shows one embodiment of the invention, the spray head 41 is rotated by the motor 35, which acts by way of the drive chain 36. The chain transmits the force via an internal pipe in the arm 43 to the spray head 41, which is thus rotated.

Alternatively, it is possible to make use of the pressure of the flowing liquid being conveyed at high pressure through the rear wall 12 and into the arm 43 to exert a mechanical force on the rotatable head 41. As a result, the head 41 is set in rotation, and the liquid emerging from the spray nozzles 42 is sprayed onto the walls 12, 13, 14, 15, the floor 11, and the inside surface of the lid 20 in the form of tracks.

When orbital heads are used, it is possible to determine the exact course of the tracks of the spray jets in such a way that each successive track is directly adjacent to the previous one, so that in practice the entire reachable surface of the cooking space is covered uniformly.

It is possible to use a sensor to detect the current position of the jet of liquid. On the basis of these detected positions, a control unit can automatically cause the high-pressure jet of liquid to remain for a longer period of time on the surface areas of the cooking space lying farther away from the center, so that the desired cleaning action is obtained.

When food is to be cooked, the cleaning arm 43 is removed from the rear wall 12 and replaced by a blind stopper (not shown).

The cleaning arm 43 is attached to the opening provided in the rear wall 12 preferably without the need for tools; the arm 43 can be fastened to the rear wall 12 by means of a bayonet-like connection, for example.

Referring again to FIG. 2, we can see that a cleaning agent 51 has been added to the cooking space 16, where it combines with the liquid introduced by the liquid jets 45 to form a washing solution 17. The drain 30 is kept closed during the cleaning process. The liquid jets 45 introduced under high pressure cause the washing solution 17 to swirl and splash throughout the cooking space 16, wherein the cleaning process can be assisted thermally, i.e., by heating the cooking space.

As has been discovered, the ability of the liquid jets 45 emerging from the spray head 41 to cover, in the form of adjacent tracks, the bottom of the cooking space 16 holding the washing solution 17 results in a highly uniform coverage of the desired areas of the walls with the washing solution 17, as if wiped of with a wiper blade, which leads to extremely effective cleaning.

It is also possible to control the water feed to the spray head 41 or to control the movement of the spray head 41 in a special way so as to wet certain areas of the walls to a greater or lesser extent or to subject them to more or less of the high-pressure treatment, so that, for example, the applied liquid can act for a longer period of time on those areas. The flow volume being delivered will determine the length of time that the water is supplied. If the flow volume is low, the water will be supplied for a longer time than if the flow volume were high.

After a short initial wetting time ranging from approximately 20-40 seconds up to a minute, the exact time depending on the flow volume being used, the flow of high-pressure liquid from the spray head 41 of the cleaning device 40 is turned off to stop the wetting. The washing solution 17 can now go to work loosening the food residues, wherein this process can be allowed to proceed for about 10-15 minutes, for example.

The loosening of the food residues can be assisted by heating the cooking space 16. In one embodiment, furthermore, the loosening process in the heated cooking space can be effectively supported by a correspondingly high degree of humidity in the cooking space 16.

According to the present invention, it is possible in particular to repeat, once or several times, the step of distributing the washing solution 17 and the following step of allowing the solution to work.

Next, the drain 30 of the cooking space is opened. Then liquid is supplied again under high pressure from the spray head. By means of this step, the loosened residue or dirt is effectively removed completely and washed out of the cooking space 16 through the drain 30.

The jet coming from the spray nozzles 42 of the spray head 41, finally, can also be used to rinse the cooker clean after the spent washing solution 17 has been discharged through the drain 30.

The phrase "high-pressure cleaning" is understood to mean a high-pressure cleaning process during which a liquid jet leaves the spray nozzles 42 at a pressure of up to 160 bars, corresponding to 16 MPa, and shoots toward the inside surface of the cooking space. High-pressure cleaning devices of this type are so far unknown in the prior art. With the help of this high pressure, which causes the emerging liquid jets to travel at extremely high velocity, the "mechanical" cleaning of the surfaces of the cooking space can be effectively carried out.

Figure 5:
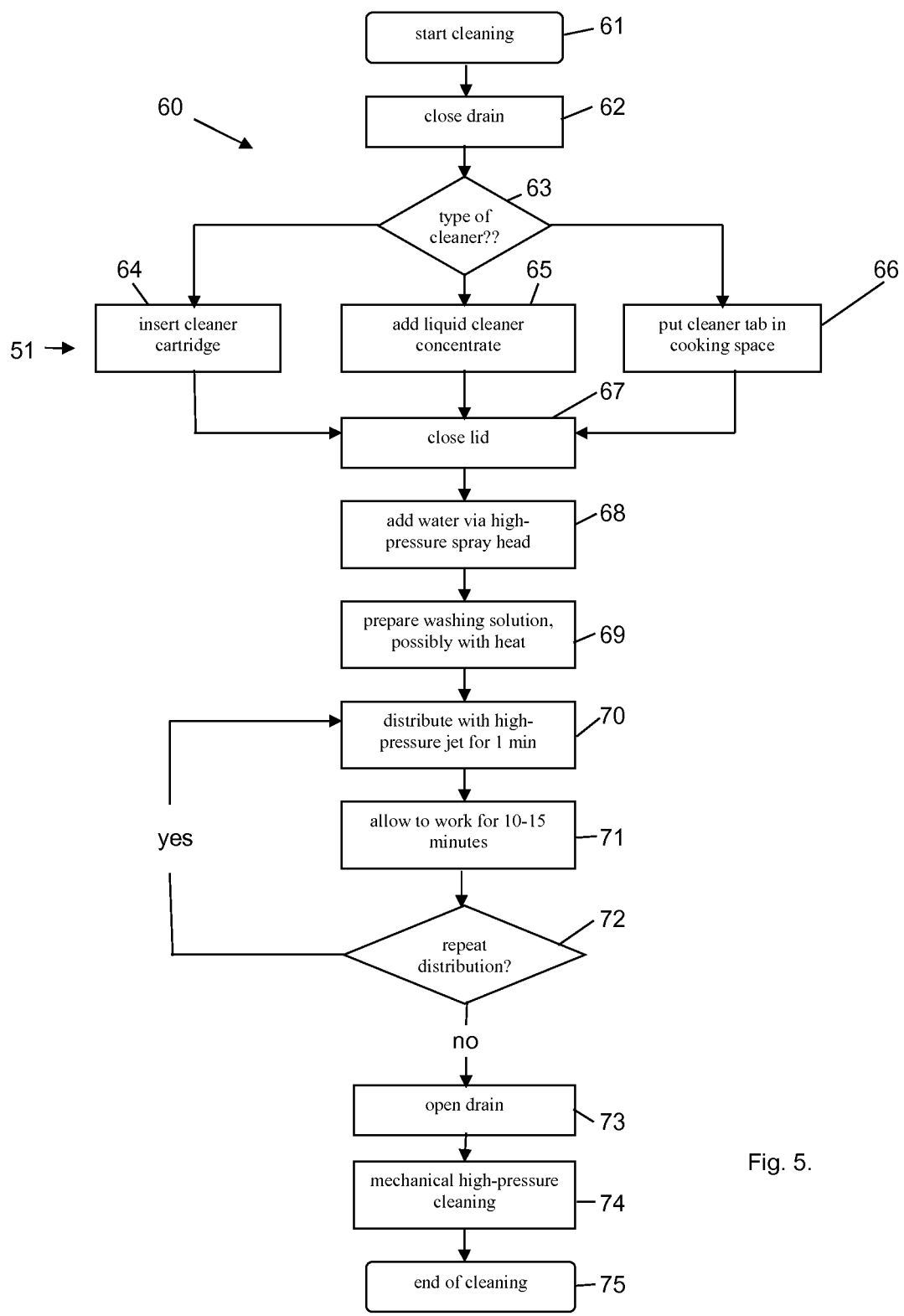
FIG. 5 shows a flow chart with a schematic diagram of one embodiment of the inventive method.

Reference is now made to FIG. 5, which shows schematically a flow chart of the various steps of the method, which are carried out during a preferred embodiment of the inventive method.

According to the flow chart 60, the cleaning process is started in step 61. The first step 62 is to close the drain 30. Then the user must decide, in step 63, whether or not a cleaning agent cartridge is to be used in step 64, whether a liquid cleaning concentrate is to be added in step 65, or whether a cleaning agent tab is to be placed in the cooking space in step 66.

After this decision has been made and the cleaning agent 51 has been selected and placed in the cooking space, the lid is closed in step 67. Water is introduced via the high-pressure spray head 41 in step 68, and the washing solution 17 is produced in step 69, wherein the washing solution 17 is possibly heated.

In step 70, the high-pressure cleaning jet swirls and splashes the washing solution around and thus distributes it over the inside walls of the cooking space. After that, in step 71, the washing solution is allowed to act on the inside walls for a previously determined period of time.

By checking the cooking space, either through actual visual inspection by the user, or by the use of the optical sensors provided, it can be decided, in step 72, whether or not the washing solution should be distributed again. Alternatively, a previously determined number of repetitions can be stored in the control unit, which then carries them out correspondingly.

If the decision is negative, i.e., if the precleaning has been deemed sufficient, the drain 30 is opened in step 73, as a result of which the cleaning medium is able to leave, whereupon the mechanical high-pressure cleaning takes place in step 74. Because the drain 30 is now open, this newly introduced liquid drains away immediately, as a result of which the cleaning process is completed, as indicated in step 75.

The present invention is not limited to the exemplary embodiments presented here. For example, a cover element can be provided, which can be moved into a position above the rotatable spray head of the cleaning device inside the cooking space 16 for the cleaning process.

A reservoir for the cleaning agent, furthermore, can be provided on the cover element.

The present invention, therefore, offers both a cooker equipped for simple and fully automatic cleaning of the cooking space and a corresponding method, which provide the user with the various advantages outlined above.

LIST OF REFERENCE NUMERALS

1 cooking appliance or cooker
3 control panel
10 pan
11 bottom
12 rear wall
13 side wall
14 side wall
15 front wall
16 cooking space
17 washing solution
20 lid
21 joint
25 frame
30 drain
31 drain pipe
33 arrow
35 motor
37 mounting plate
40 cleaning device
41 spray head
42 spray nozzles
43 cleaning arm
45 liquid jets
46 axis
47 axis
48 arrows
49 coupling
51 cleaning agent
60 flow chart
61-75 steps of the method

The invention claimed is:

1. A method for cleaning residues from a cooking space of a cooking appliance suitable for the cooking of food products, comprising the steps of:
   (a) providing the cooking appliance, the cooking appliance comprises:
      a pan having inside walls having a front wall, a rear wall, two side walls, and a bottom, the inside walls forming an interior space, the interior space being a cooking space, said cooking space being open to an upside;
      a lid, which serves to close the cooking space, and forms the upside wall of the cooking space when closed;
      a drain, which is formed in the bottom of the pan and which can be closed or used to discharge liquid in particular from the cooking space when desired; and
      at least one rotatable spray nozzle, the at least one rotatable spray nozzle introducing a liquid jet under high pressure into the cooking space, the at least one rotatable spray nozzle being mounted on a rotatable spray head for introducing the liquid jet into the cooking space, the at least one rotatable spray nozzle rotates around an axis perpendicular to a rotational axis of the rotatable spray head rotating around the rotational axis;
   (b) placing food products in the cooking space from the upside of the cooking space into the interior space;
   (c) cooking the food products with the cooking appliance, the food products being in direct contact with the inside walls during cooking;
   (d) closing the drain and adding a cleaning agent to the cooking space after the step of cooking the food products with the cooking appliance and also after the food products have been removed from the cooking space;
   (e) introducing the liquid jet under the high pressure from the rotatable spray head through the at least one rotatable spray nozzle into the interior space while the at least one rotatable spray nozzle rotates around the axis perpendicular to the rotational axis of the rotatable spray head rotating around the rotational axis, the liquid jet consists exclusively of water, and after this agent has been allowed to work for a certain period of time, the liquid jet swirls and splashes the cleaning agent within the cooking space onto the walls and the inside surface side of the closed lid, the liquid water jet together with the cleaning agent forming a washing solution;

(f) opening the drain and again introducing the liquid jet under the high pressure from the rotatable spray head through the at least one rotatable spray nozzle into the interior space while the at least one rotatable spray nozzle rotates around the axis perpendicular to the rotational axis of the rotatable spray head rotating around the rotational axis, said liquid jet under the high pressure removes the residues mechanically from the bottom, the walls, and the inside surface of the lid together with the splashed washing solution; and (g) carrying away the washing solution containing the removed residues during and after step (f) out of the cooking space via the drain.

2. The method of claim 1 wherein if additional cleaning is required to ensure cleanliness or to meet hygienic requirements of the cooking space, after step (e) and before step (f), the cleaning agent is allowed to work for a longer period of time on the inner walls and the inside surface of the lid.

3. The method of claim 1 further including before the step of adding the cleaning solution, closing the drain leading from the cooking space of the pan; after the step of adding the cleaning solution but before the step of introducing the liquid jet, closing the lid; and opening the drain before step (f), so that residues are then carried away together with the washing solution.

4. The method of claim 3 wherein after said residues are then carried away together with the washing solution, the following step is carried out, repeating the step of introducing the liquid water jet under the high pressure from the rotatable spray head through the at least one rotatable spray nozzle into the interior space for a previously determined period of time.

5. The method according to claim 1 wherein before opening the drain the liquid jet swirls and splashes the cleaning agent within the cooking space onto the walls and the inside surface of the closed lid repeatedly for several times in succession.

6. The method according to claim 1 wherein step (f) is repeated several times in succession.

7. The method according to claim 1 wherein the liquid jet coming from the rotatable spray head is controlled in such a way that it lifts the washing solution in waves against the walls of the cooking space and the lid.

8. The method according to claim 1 wherein the liquid jet coming from the rotatable spray head is controlled in such a way that it passes over only the bottom of the cooking space at least for a limited period of time, this being accomplished by actuating the moving rotatable spray head in such a way that it moves only back and forth or by turning on the water feed only when the rotatable spray head is passing over the area of the bottom.

9. A method for cleaning residues from a cooking space of a cooking appliance suitable for the cooking of food products, comprising the steps of:

(a) providing the cooking appliance, the cooking appliance comprises:
a pan having inside walls having a front wall, a rear wall, two side walls, and a bottom, the inside walls forming an interior space, the interior space being a cooking space, said cooking space being open to an upside;
a lid, which serves to close the cooking space, and forms the upside wall of the cooking space when closed;
a drain, which is formed in the bottom of the pan and which can be closed or used to discharge liquid in particular from the cooking space when desired; and
at least one rotatable spray nozzle, the at least one rotatable spray nozzle introducing a liquid jet under high pressure into the cooking space, the at least one rotatable spray nozzle being mounted on a rotatable spray head for introducing the liquid jet into the cooking space, the at least one rotatable spray nozzle rotates around an axis perpendicular to a rotational axis of the rotatable spray head rotating around the rotational axis;

(b) placing food products in the cooking space from the upside of the cooking space into the interior space;

(c) cooking the food products with the cooking appliance, the food products being in direct contact with the inside walls during cooking;

(d) closing the drain and adding a cleaning agent to the cooking space after the step of cooking the food products with the cooking appliance and also after the food products have been removed from the cooking space;

(e) introducing the liquid jet under the high pressure from the rotatable spray head through the at least one rotatable spray nozzle into the interior space while the at least one rotatable spray nozzle rotates around the axis perpendicular to the rotational axis of the rotatable spray head rotating around the rotational axis, the liquid jet consists exclusively of water, and after this agent has been allowed to work for a certain period of time, the liquid jet swirls and splashes the cleaning agent within the cooking space onto the walls and the inside surface of the closed lid, the liquid water jet together with the cleaning agent forming a washing solution;

(f) allowing the cleaning agent to work for a further certain period of time and opening the drain and again introducing the liquid jet under the high pressure from the rotatable spray head through the at least one rotatable spray nozzle into the interior space while the at least one rotatable spray nozzle rotates around the axis perpendicular to the rotational axis of the rotatable spray head rotating around the rotational axis, said liquid jet under the high pressure removes the residues mechanically from the bottom, the walls, and the inside surface of the lid together with the splashed washing solution;

(g) carrying away the washing solution containing the removed residues during and after step (f) out of the cooking space via the drain; and (h) repeating step (f) one or more times in succession.

* * * * *